United States Patent [19]

Nakamura et al.

[11] 4,112,448
[45] Sep. 5, 1978

[54] RESETTABLE SELF-TIMER

[75] Inventors: Yukio Nakamura; Shogo Kato, both of Yotsukaido, Japan

[73] Assignee: Seiko Koki Kabushiki Kaisha, Japan

[21] Appl. No.: 752,557

[22] Filed: Dec. 20, 1976

[30] Foreign Application Priority Data

Dec. 19, 1975 [JP] Japan .................... 50-171639[U]

[51] Int. Cl.² .............................................. G03B 9/64
[52] U.S. Cl. .................................................. 354/239
[58] Field of Search ................................ 354/239, 240

[56] References Cited

U.S. PATENT DOCUMENTS

| | | | |
|---|---|---|---|
| 1,941,292 | 12/1933 | Decket et al. | 354/239 |
| 3,154,951 | 11/1964 | Vuilleumier et al. | 354/239 X |
| 3,276,344 | 10/1966 | Rentschler | 354/239 |

Primary Examiner—Richard A. Wintercorn
Attorney, Agent, or Firm—Robert E. Burns; Emmanuel J. Lobato; Bruce L. Adams

[57] ABSTRACT

In a self-timer starting its operation by releasing blocking of an anchor or intermediate gear blocking member, a self-timer featured in that there are provided a blocking lever which is able to move said anchor or intermediate gear to blocking position and a locking lever capable of locking said blocking lever in a releasing position, said locking lever being pushed by the intermediate gear shaft removable along a guide groove to set free the engagement of a gear train, and the blocking of the anchor or intermediate gear being so arranged as to be made by releasing locking of the blocking lever, thus enabling a driving shaft to be reset at any desired position during operation of said self-timer.

9 Claims, 4 Drawing Figures

RESETTABLE SELF-TIMER

BACKGROUND OF THE INVENTION

It is usual that self-timers for use in conventional cameras have been unable to lock them in the winding-up condition even if stopping photographing intention and rewinding a self-chaging lever, after once started, and even a fewer number of re-lockable ones have been able to wind up the self-charging lever to its final position. Nevertheless, in case of using such self-timer, the whole self time (normally, approx. 10 seconds) has not been spent, but a camera will be released in a short self-time of 3 or 5 seconds after winding up the charging lever up to a halfway position. In such a case, after starting the self-timer once, stopping photographing intention and then locking it in the winding-up condition after winding up the charging lever up to the halfway position again was impossible even in the aforementioned re-lockable self-timer.

SUMMARY OF THE INVENTION

The present invention, in view of the above respect, has made it possible to reset a self-timer in any desirable self-time condition by restarting winding-up up to an arbitrary position as required even after staring, and can conform to requirements in all posible when photographing by the use of a self-timer.

In accordance with the present invention, this object can be achieved in the following manner. There is provided a locking lever capable of locking in its anchor-blocking position an anchor-blocking lever allowing a gear train to rotate by displacing said anchor (or star wheel) from its blocking position to its unblocking position by the use of a start button of the self-timer, said locking lever being allowed to be engaged with a gear shaft displacing along a guide groove to release the engagement of the gears in case of self-winding, and self-timer can be locked in the winding-up condition by releasing the locking of said anchor-blocking lever in virtue of said locking lever due to the displacement of said shaft, and also returning the anchor-blocking lever to the anchor-blocking position, and when winding up the charging lever a little even after starting the self-timer once, the self-timer will be restored to the winding-up condition from that position, thus making it possible to reset the timer at any desired position.

DESCRIPTION OF PREFERRED EMBODIMENTS

Figure 3:
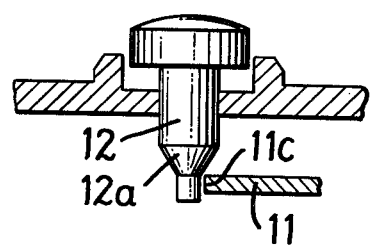
FIG. 3 is a side view showing the relationship between a start button and an anchor-blocking lever.
Figure 4:
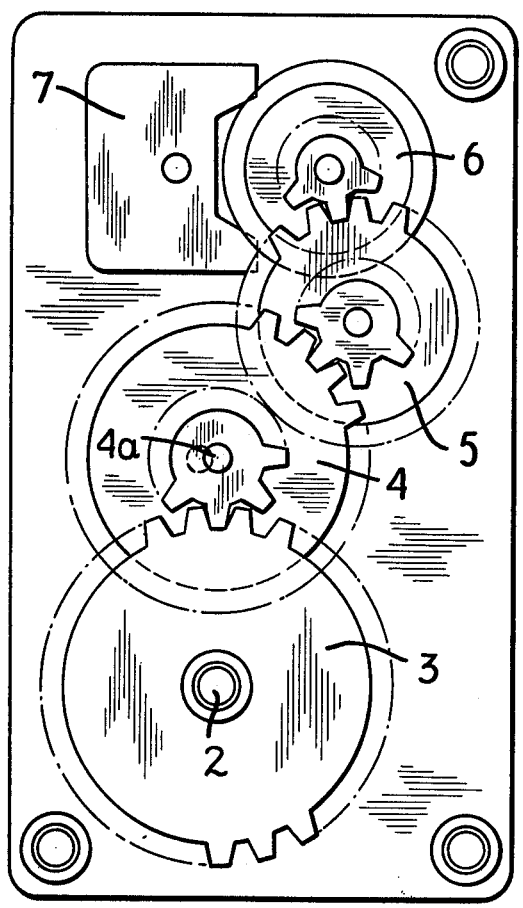
FIG. 4 is a plan showing a gear train with a part cut away.

In the drawings, numeral number 1 designates an upper plate of a self-timer, 2 designates a driving spring-loaded driving shaft which is biased clockwise by a spring (now shown) and is mounted securely on a 1st gear 3 that is connected to a star wheel 6 and an anchor 7 by way of a 2nd gear 4 and a 3rd gear 5. When charging the driving shaft 2 counterclockwise against the driving spring, the 2nd gear 4 will be displaced leftward in the drawing by movement of its shaft 4a along the guide groove 1a and will be disengaged from the 3rd gear 5. On the driving shaft 2 is fixed a driving cam 8, on which a projection 8a is provided. Number 9 designates a plunger lever pivoted to the upper plate 1, whose arm portion 9a is pressed to be in contact with a notch 10a of a camera release rod 10 by a spring 9c at all times, while the other arm portion 9b is positioned within the operating path of the projection 8a of the driving cam 8 and is rotated counterclockwise by the projection 8a when the driving cam is operated clockwise to push down the camera release rod, thus releasing the camera. Number 11 designates an anchor-blocking lever biased to rotate clockwise by a spring 11d, whose bent portion 11a can block the anchor 7, which has a pawl 11b on one end, and, as shown in FIG. 3, the lever will release the anchor-blocking when rotated counterclockwise by the portion 11c being pushed by a tapered portion 12a of the start button 12. Number 13 designates a locking lever, biased counterclockwise by a spring 13c and whose arm portion 13a engages with the pawl 11b of the anchor-blocking lever to permit the anchor-blocking lever 11 to be locked at the position where the anchor 7 will not be blocked, while the other arm portion 13b can be engaged with the shaft 4a of the 2nd gear which is displaced when self-charging. Pins 15 and 16 secured to the upper plate are stops for limiting the rotating range of the driving cam 8.

Figure 1:
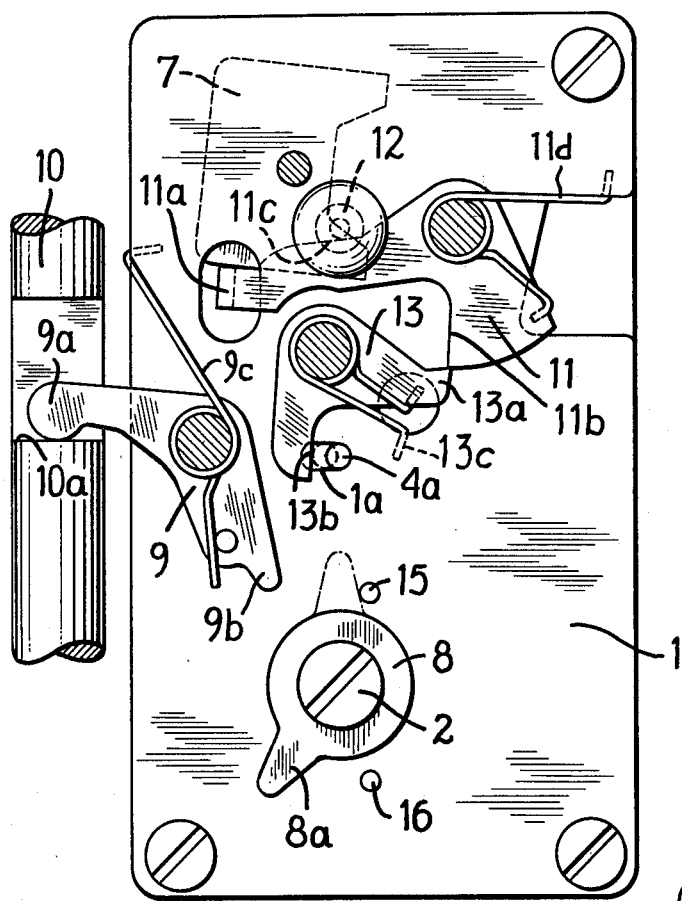
FIG. 1 is a plan view showing the winding-up condition of a self-timer.
Figure 2:
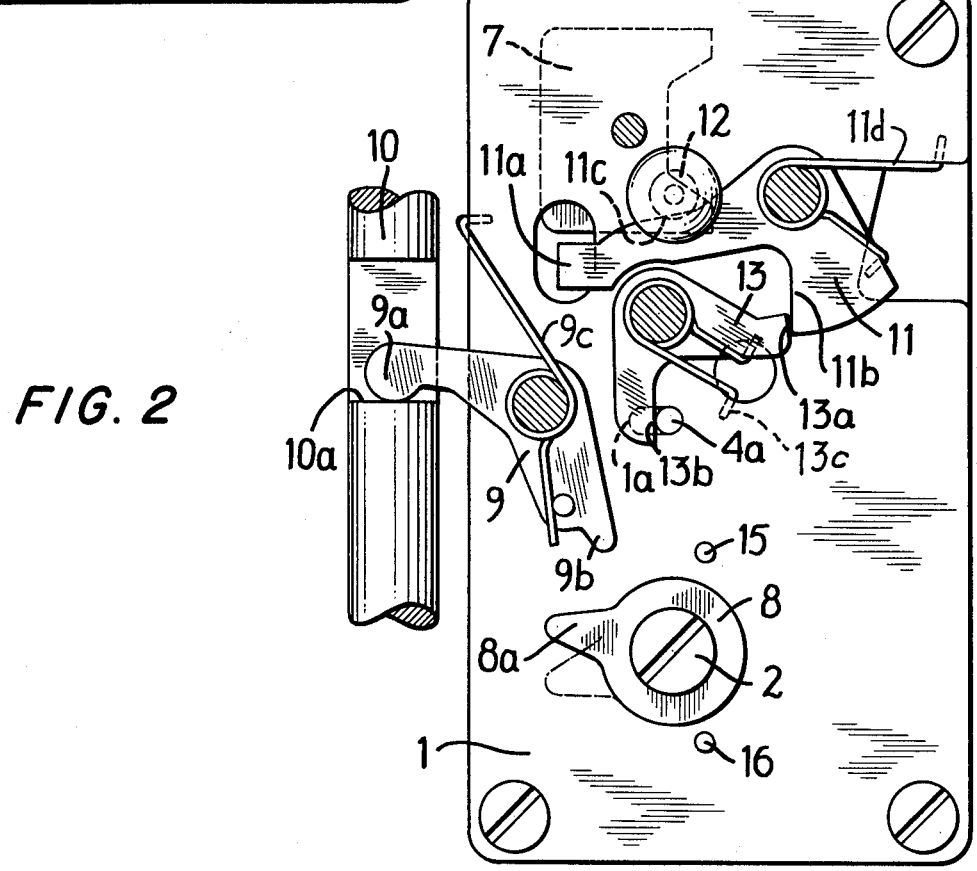
FIG. 2 is a plan showing the operating condition.

Referring now to its operation, when rotating the anchor-blocking lever 11 counterclockwise from the winding-up condition shown in FIG. 1 by pushing the start button 12 to release anchor-blocking, the gear train will start rotation by the driving spring (now shown) acting of shaft 2, and then the driving cam 8 starts rotation clockwise. In this instance the 2nd gear 4 is pushed rightward in the drawing by tooth pressure exerted by gear 3, and the shaft 4a will rotate while it is being pressed against the right end of the guide groove 1a. On the other hand, when the blocking lever 11 is rotated counterclockwise, even after the arm portion 13a of the locking lever 13 has intruded into is pawl 11b, putting off the start button to return it to the original position, said lever cannot return to the anchor-blocking position. The locking lever 13 will stop by the other arm portion 13b abutting with the shaft 4a of the 2nd gear 4, after the arm portion 13a has intruded into the pawl 11a of the anchor-blocking lever 11. This condition is shown in FIG. 2, more specifically, normally the rotation of the driving cam 8 will proceed, the projection 8a will engage with the arm portion 9b of the plunger lever 9 to push it to rotate counterclockwise and the other arm portion 9a will push down 10a of the camera release rod 10 to release locking. After releasing, the locking of the projection 8a of the driving cam with the arm portion 9b of the plunger lever 9 will be disengaged, then the driving cam will rotate slightly, abut with the stopper 15 in the position indicated with one-dotted broken line in FIG. 1 and then stop its rotation. On the other hand, the plunger lever 9 will return to a fixed position in accompaniment with the return of the release rod after the camera has been release. Self-charging can be performed by winding up the driving cam rotated from the one-dotted broken line position in FIG. 1 counterclockwise by a lever (not illustrated). At this moment, a clockwise rotating force will be transferred to the 2nd gear, and the shaft 4a will be displaced leftward along the guide groove 1a and the second gear 4 will be disengaged from the engagement with the 3rd gear 5 and at the same time rotate the locking lever 13 to release its arm portion 13a from the pawl 11b of the anchor-blocking lever. The anchor-blocking lever 11 whose pawl 11b has been disengaged will rotate clockwise to lock the anchor the bent portion 11a.

When charging the driving cam 8 further, the projection 8a and the arm portion 9b of the plunger lever 9 will be displaced, thereafter the driving cam 8 can be charged up to any desired position.

Next, when describing the case when recharging a self-time to stop photographing due to some reason after self-starting, if rotating the driving cam in the condition of FIG. 2 counterclockwise a little and then rotate it to the charging direction, a clockwise rotation will be conveyed to the 2nd gear 4, the shaft 4a will be displaced leftward along the guide groove 1a to push the locking lever 13 which will be pushed to rotate clockwise. With this, as mentioned above, the anchor will be locked to engage in the setting condition, and again it may be possible to start the self-timer as in the foregoing. In the embodiment it has been described to engage it in the locking condition by blocking the anchor, but it goes without saying that not only the anchor but also intermediate wheels such as the star wheel may be blocked.

As mentioned above, according to the present invention, braking of the anchor can be made by rotating the driving cam a little in the charging direction, so it has such advantages that a position of setting can be taken as desired, resetting once started self-timer on the way can be made, the application of a self-timer will be expanded, and its cost is low due to its simple construction.

What we claim is:

1. A self-timer mechanism for a camera comprising rotatable driving means which is biased to rotate in a predetermined angular direction for driving a camera shutter release member, charging means for rotating said driving means in the opposite angular direction, a member having a drive connection with said driving means, locking means for releasably locking the said member and thus said driving means, release means which is movable into a released position for releasing said locking means to permit said driving means to rotate in the said predetermined angular direction, and drive disconnection means which, whenever said charging means is operated to rotate said driving means in the said opposite angular direction, effects disconnection of said connection and movement of said locking means into its locked position, the said drive connection being automatically restored when the charging means is no longer so operated.

2. A self-timer mechanism as claimed in claim 1, in which said member which is lockable by said locking means is a first gear which forms part of a gear train drivingly connected to the said driving means, the drive disconnection means being operative to effect drive disconnection between gears of said gear train.

3. A self-timer mechanism as claimed in claim 2, in which said first gear is mounted on a first shaft which is displaceable with respect to a second shaft on which is mounted a second gear of the gear train, rotation of the driving means in the said opposite angular direction causing displacement of the first-mentioned shaft to disengage said first and second gears.

4. A self-timer mechanism as claimed in claim 3, in which said first shaft is displaceable radially of said second gear.

5. A self-timer mechanism as claimed in claim 1, comprising a lever which is biased to an operative position in which said locking means is maintained in its locked position, and a detent positionable in an operative position in which said lever is moved out of its operative position to release said locking means.

6. A self-timer mechanism as claimed in claim 5, in which said first gear is mounted on a first shaft which is displaceable with respect to a second shaft on which is mounted a second gear of the gear train to disengage said first gear from said second gear, and in which displacement of the first-mentioned shaft moves said detent into an inoperative position.

7. A self-timer mechanism as claimed in claim 5, in which said release means is engageable with said lever to move said lever into its inoperative position.

8. A self-timer mechanism as claimed in claim 2, further comprising an operating lever for operating said shutter release, in which said driving means comprises a driving shaft which carries a gear of said gear train, said driving shaft carrying a cam a portion which is engageable with said operating lever for operating the said shutter release member.

9. A self-timer mechanism for a camera having camera shutter release means comprising an operating lever for operating said shutter release means, a spring biased rotatable driving shaft, a cam fixed on said driving shaft and engageable with said operating lever to operate said lever to operate said shutter release means, a first gear fixed on said driving shaft, a rotatable second gear, locking means for releasably locking said second gear, manually operable lock release means for releasing said locking means to permit rotation of said second gear, a gear train connecting said first gear with said second gear, said gear train comprising a third gear meshing with another gear of said gear train and having a pinion meshing with said first gear, said third gear and its pinion being fixed on a shaft which is movable in a direction to disengage said third gear from said other gear when said driving shaft with said first gear is rotated in a direction against its bias to charge said self-timer mechanism and resetting means operable by said movement of said third gear shaft to reset said locking means to locked portion, whereby manual rotation of said driving shaft in a charging direction after release of said locking means by said lock release means effects resetting of said locking means to lock said second gear and through said gear train to lock said driving shaft until said lock release means is again actuated to released position.

* * * * *